United States Patent [19]

Skruhak et al.

[11] Patent Number: 5,241,637
[45] Date of Patent: Aug. 31, 1993

[54] DATA PROCESSOR MICROSEQUENCER HAVING MULTIPLE MICROADDRESS SOURCES AND NEXT MICROADDRESS SOURCE SELECTION

[75] Inventors: Robert J. Skruhak; James C. Nash; James B. Eifert, all of Austin, Tex.

[73] Assignee: Motorola, Inc., Schaumburg, Ill.

[21] Appl. No.: 15,388

[22] Filed: Feb. 8, 1993

Related U.S. Application Data

[63] Continuation of Ser. No. 461,595, Jan. 5, 1990, abandoned.

[51] Int. Cl.⁵ .................. G06F 9/22; G06F 9/38
[52] U.S. Cl. .................. 395/375; 364/DIG. 1; 364/231.8; 364/262.4; 364/262; 364/8; 364/263
[58] Field of Search .................. 395/375, 775

[56] References Cited

U.S. PATENT DOCUMENTS

| | | | |
|---|---|---|---|
| 3,855,577 | 12/1974 | Vandierendonck | 395/750 |
| 4,388,682 | 6/1983 | Eldridge | 364/200 |
| 4,415,969 | 11/1983 | Bayliss et al. | 364/200 |
| 4,443,848 | 4/1984 | Gehman | 364/200 |
| 4,461,000 | 7/1984 | Young | 371/21 |
| 4,825,363 | 4/1989 | Baumann et al. | 364/200 |
| 4,887,203 | 12/1989 | MacGregor et al. | 395/375 |
| 4,958,275 | 9/1990 | Yokouchi | 395/375 |
| 5,093,775 | 3/1992 | Grundmann et al. | 395/375 |
| 5,101,344 | 3/1992 | Bonet et al. | 395/375 |

OTHER PUBLICATIONS

Neil H. E. West and Kamran Eshraghian, "Principles of CMOS VLSI Design—A Systems Perspective," Addison-Wesley Publishing Company, Oct. 1985, pp. 368-379.

*Primary Examiner*—Kevin A. Kriess
*Attorney, Agent, or Firm*—Jonathan P. Meyer; Robert L. King

[57] ABSTRACT

A data processor having a microsequencer which reduces power consumption selectively activates instruction decode units and a microcode sequence control memory unit. The microsequencer has an instruction decode unit implemented with a plurality of PLAs and also has a microcoded ROM for providing the next microaddress. The instruction decode unit outputs a next microaddress, a next-PLA field, and a ROM-or-PLA control bit. The control bit functions to minimize power in the data processor. The next-PLA field is latched and used to select a single decode unit when the next instruction decode is needed to activate a predetermined decode unit. Early macroinstruction branching can be performed in the data processor thereby improving performance.

2 Claims, 5 Drawing Sheets

DATA PROCESSOR MICROSEQUENCER HAVING MULTIPLE MICROADDRESS SOURCES AND NEXT MICROADDRESS SOURCE SELECTION

This application is a continuation of prior application Ser. No. 07/461,595, filed on Jan. 5, 1990, now abandoned.

CROSS REFERENCE TO RELATED APPLICATION

Application Ser. No. 08/079,429, entitled, "A Data Processor Microsequencer Having A Macroinstruction Decoder With Next Instruction Decode Type Information" filed simultaneously herewith by Robert Skruhak et al.

FIELD OF THE INVENTION

This invention relates generally to data processors, and more particularly to data processors with microcoded microsequencers.

BACKGROUND OF THE INVENTION

Typically, known data processors comprise a microsequencer and an execution unit. The execution unit is where data operations are performed and typically comprises an arithmetic unit, registers, buses, and a data shifter. The microsequencer is usually either 'hardwired', i.e. designed using combinatorial logic gates, or 'microcoded', i.e. designed using a programmable memory. Microcode design has the advantage that the microsequencer architecture is more simple and straightforward, and the microsequences can be easily modified by reprogramming the memory. The memory which stores the microcode is referred to as the microstore, and is often implemented as read-only-memory (ROM), or as read/write, random access memory (RAM). In a microcoded design, the user visible 'macroinstruction' of the data processor is executed by one or several microinstructions. These microinstructions control the execution unit so as to perform the function of the macroinstruction. A sequence of microinstructions, referred to as a microroutine or a microprogram, may be necessary in order to execute a complex macroinstruction.

There are two known primary approaches to sequencing a microprogram. The first approach utilizes an incrementor, or microprogram counter ($\mu$PC), to address sequential microinstructions in the microstore. Microcode branching is handled by loading a new value, specified by the microinstruction, into the $\mu$PC. A second approach to sequencing the microprogram requires that each microinstruction explicitly specify the address of the next microinstruction to be used, such that branching is inherent in each microinstruction. With this approach, conditional branching requires that an additional next microinstruction address (NMA) be specified for the second branch case. In this second approach, there is often a holding register, also referred to as a $\mu$PC, which temporarily holds the NMA during microstore accesses.

In a typical pipelined dataprocessor, macroinstructions are "fetched" from a main memory and stored in an instruction pipeline (pipe) made up of "instruction registers" (IRs). The pipe is structured such that instructions enter at one end, and the values are shifted toward the other end where they are used and then discarded. Instruction decode logic (often a programmable logic array (PLA)) accesses the instructions in the pipe and "decodes" the macroinstruction. This "decode" provides the initial microstore address of the microroutine that is to be used to perform the particular macroinstruction. At the conclusion of a microroutine, the microinstruction will request another instruction decode to determine which microroutine to execute next. This instruction decode may be a further decode of the same macroinstruction word, a decode of additional words of a multiword macroinstruction, or a decode of a new macroinstruction.

Macroinstructions are often performed by using several general purpose microroutines in succession. Allowing macroinstructions to share common microroutines reduces the amount of memory required in the microstore. Linking between microroutines is accomplished by microcode branching or by instruction decode requests.

SUMMARY OF THE INVENTION

Accordingly, it is an object of the present invention to provide an improved data processor microsequencer.

Another object of the present invention is to provide an improved data processor microsequencer which minimizes power consumption.

In carrying out the above and other objects of the present invention there is provided a data processor microsequencer having a first portion for receiving and storing macroinstructions and selectively outputting the macroinstructions. A second portion when enabled outputs a next microinstruction address in response to receipt of a microinstruction address and also provides a control signal in response to receipt of the microinstruction address. The second portion is selectively disabled in response to a first disable signal. A third portion is coupled to the first portion and when the third portion is enabled it receives the macroinstructions and decodes the macroinstructions to provide the microinstruction address in response thereto. The third portion also provides the control signal and is selectively disabled in response to a second disable signal. A fourth portion is coupled to both the second and third portions and receives the control signal and provides the first and second disable signals.

These and other objects, features and advantages, will be more clearly understood from the following detailed description taken in conjunction with the accompanying drawings.

DETAILED DESCRIPTION OF THE INVENTION

Figure 1:
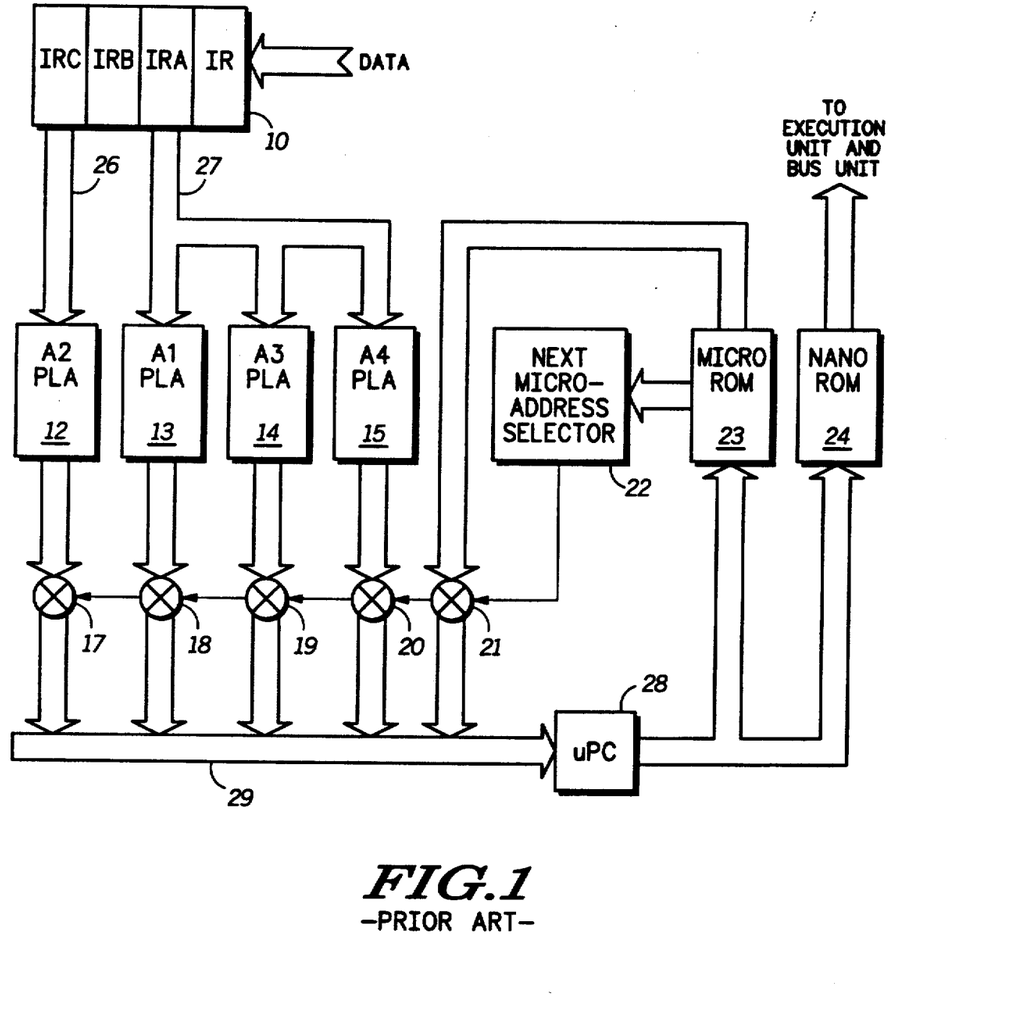
FIG. 1 is a block diagram of a known data processor microsequencer.

The block diagram of FIG. 1 depicts a known microarchitecture as is implemented in the MC68000 and MC68020 microprocessors commercially available from Motorola Inc. Referring to FIG. 1, an instruction pipe 10 holds a plurality of macroinstructions. The contents of an instruction register C (IRC) are coupled to a decode A2-PLA 12 by a bus 26. The contents of an instruction register A (IRA) are coupled to PLAs labeled A1-PLA 13, A3-PLA 14 and A4-PLA 15 by a bus 27. The macroinstructions sequentially advance down the instruction pipe 10 thru instruction registers labeled IR, IRA, IRB and IRC. The advancement is controlled by microcode and/or a separate state machine (not shown) such that instruction register IRC contains the appropriate instruction word to be decoded when A2 PLA calls (defined below) are made, and instruction register IRA contains the appropriate instruction word to be decoded when A1, A3, or A4 PLA calls are made. PLAs labeled 12-15 as well as a microROM 23 are active (or strobed) every microcycle with each PLA and microRAM 23 generating a next microaddress (NMA) which is defined below An output field of microROM 23, specifying branch conditions and which if any PLA to call, is used by a next microaddress selector (NMA selector) 22 to determine which one of PLAs 12-15 or microROM 23 should supply the NMA. The NMA selector 22 enables one of five drivers 17-21 to drive a next microaddress onto a bus 29 and into a microprogram counter latch 28 (μPC) which provides the address for the microROM 23 and a nanoROM 24 which together form the microstore. For direct microcode branching (defined below), driver 21 is activated and microROM 23 supplies the NMA. For an A1-PLA call, driver 18 is activated and PLA 13 supplies the NMA. For an A2-PLA call, driver 17 is activated and PLA 12 supplies the NMA. For an A3-PLA call, driver 19 is activated and PLA 14 supplies the NMA. For an A4-PLA call, driver 20 is activated and PLA 15 supplies the NMA. For the case of a conditional microbranch, driver 21 under the direction of the NMA selector 22 can modify certain NMA bits coming from the microROM 23 before driving the bits onto bus 29.

In the illustrated form, the microsequencer of FIG. 1 can be thought of as having four instruction decoders 12-15. These instruction decoders may be physically implemented as separate PLAs or merged into fewer PLAs. Each PLA typically provides an address for a microroutine that either performs an effective address calculation, or that performs the actual instruction operation (for example performing the addition for an ADD instruction). An effective address (EA) is used to reference locations in a main memory (not shown). The effective address may be explicitly given, or may require a calculation. The operation of the four instruction decode PLAs 12-15 will be described below.

A1-PLA 13=First instruction word initial decode
A2-PLA 12=First instruction word subsequent decode
A3-PLA 14=Second instruction word decode for an F-line instruction
A4-PLA 15=Extension word effective address decode The PLAs A1-PLA 13, A2-PLA 12 and A4-PLA 15 perform general instruction decode. This decode will typically either initiate an EA calculation routine, or an actual instruction routine. The A3-PLA 14 is used to decode F-line instructions. F-line instructions are those instructions that have their four most significant bits as logic one. These F-line instructions require a decode of both the first and second instruction words in order to determine the basic operation to be performed. Additional PLAs (not shown) may be used to generate initial addresses for special microroutines. For example, an A0-PLA (not shown) may be used to initiate special microroutines when an exception condition occurs. These exception conditions include: a reset, interrupts, error traps, tracing, illegal instructions, privilege violations, etc. These special routine PLAs are not relevent to the present invention and are therefore not further mentioned.

The decode requests made by the microcode, are referred to as PLA calls. Depending upon the particular instruction and EA modes used, the possible PLA calling sequences are given below in table I. For this table the arrow (→) represents a microroutine and the A1-A4 nomenclature represents a PLA call. As shown, each microroutine (one or more microinstructions) is initiated by an (A1) call that concluded the previous macroinstructions.

(A1)→A1
(A1)→A2→A1
(A1)→A4→A2→A1
(A1)→A2→A2→A1
(A1)→A4→A2→A2→A1
(A1)→A4→A2→A4→A2→A1
(A1)→A3→A1
(A1)→A2→A2→A3→A1
(A1)→A4→A2→A2→A3→A1

Table 1-PLA calling sequences

A MOVE.W (Ax),(Ay) macroinstruction is used as a typical example. This 'move memory to memory' macroinstruction is a single word instruction that causes the data at a main memory location specified by address register Ax to be moved to a main memory location specified by address register Ay. In this example Ax, Ay are used as opposed to specific numbered address registers, (i.e. A1,A2) in order to avoid confusion with the PLA numberings. The previous macroinstruction concludes with a microinstruction that performs an A1-PLA call. This initial A1-PLA call initiates an effective address calculation microcode for the (Ax) portion of the instruction. This microroutine concludes with an A2-PLA call which initiates an EA calculation routine for the (Ay) portion of the instruction. At the conclusion of this routine another A2-PLA call is made which initiates the microroutine to perform the 'move' operation. At the conclusion of the move microroutine, an A1-PLA call is made which will decode and start the microroutine implementing a next macroinstruction.

Figure 2:
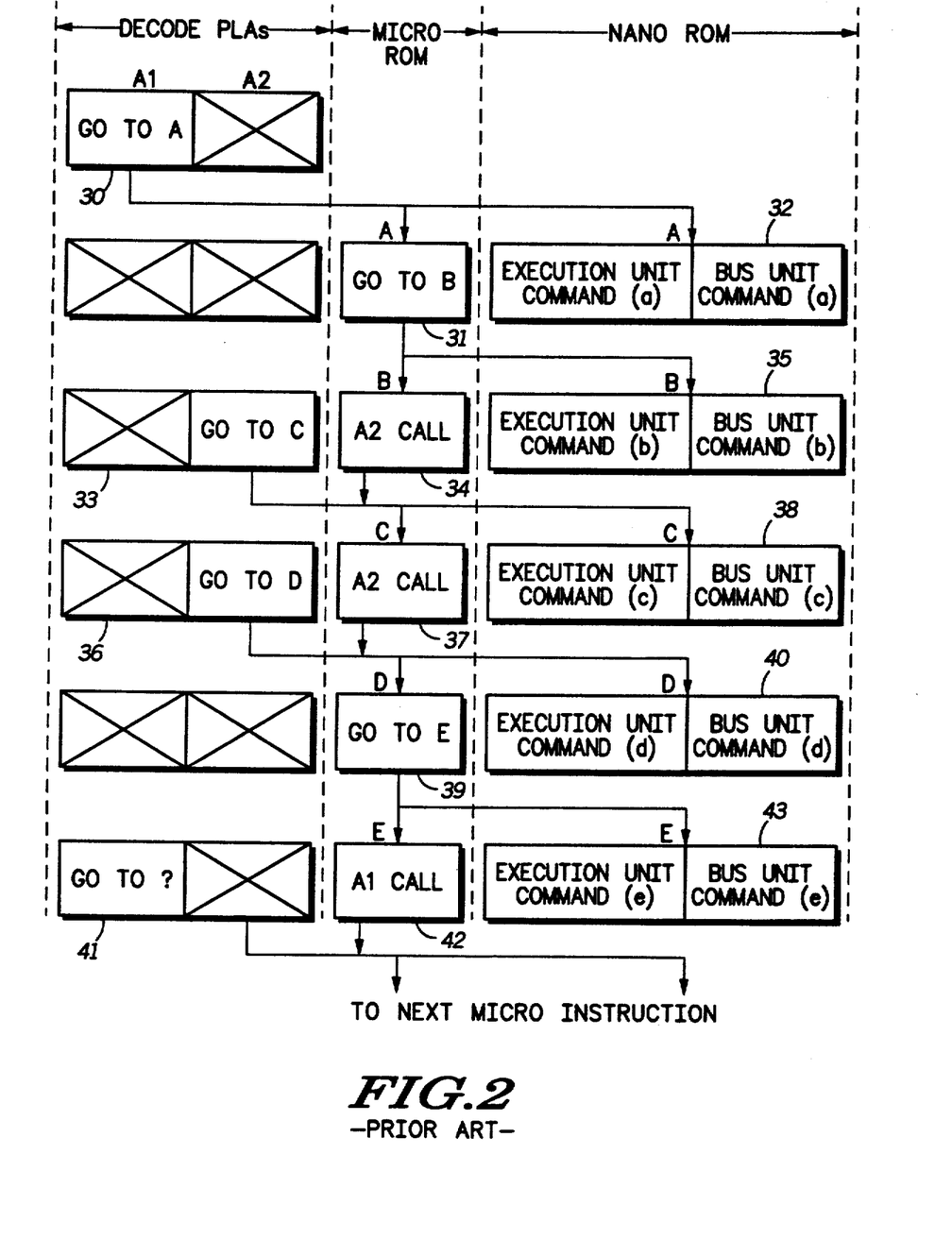
FIG. 2 is a flow diagram of a known data processor instruction sequence using the microsequencer of FIG. 1.

Shown in FIG. 2 is a flow diagram which is one example of a known instruction microcode flow. The A1-PLA 13 of FIG. 1 outputs data 30 which specifies addresss 'A' as the initial microaddress. The microROM 23 and nanoROM 24 both access location 'A', the A2-PLA 12 decodes the contents of instruction register IRC, and the A1, A3, and A4 PLAs 13, 14 and 15 decode the contents of instruction register IRA. At the next microcycle, nanoROM 24 provides an output 32 which specifies a command 'a' to an execution unit (EU) (not shown) and to a bus interface unit (BIU) (not shown). A portion of the nanoROM 24 command is used to control the execution unit and another portion is used to control the BIU. The nicroROM 23 provides an output 31 which specifies a location 'B' as the NMA to be accessed. The microROM 23 and nanoROM 24 both access location 'B', the A2-PLA 12 decodes the contents of instruction register IRC, and the A1, A3 and A4

PLAs 13, 14 and 15 decode the contents of instruction register IRA. At the next microcyle, nanoROM 24 provides an output 35 which specifies a command 'b' for the EU and BIU. The microROM 23 provides an output 34 which specifies an A2-PLA call. The A2-PLA 12 has already decoded the contents of instruction register IRC, and the A2-PLA 12 provides an output 33 which is used to specify a location 'C' as the NMA to be accessed. The microROM 23 and nanoROM 24 both access location 'C', the A2-PLA 12 decodes the contents of instruction register IRC, and the A1, A3, and A4 PLAs 13, 14 and 15 decode the contents of instruction register IRA. At the next microcycle the nanoROM 24 provides an output 38 which specifies a command 'c' for the EU and BIU. The microROM 23 provides an output 37 which specifies an A2-PLA call. The A2-PLA 12 has decoded the contents of instruction register IRC and the A2-PLA 12 provides an output 36 which is used to specify a location 'D' as the NMA to be accessed. The microROM 23 and nanoROM 24 both access location 'D', the A2-PLA 12 decodes the contents of instruction register IRC, and the A1, A3, and A4 PLAs 13-15 decode the contents of instruction register IRA. At the next microcycle the nanoROM 24 provides an output 40 which specifies a command 'd' for the EU and BIU. The microROM 23 provides an output 39 which specifies a location 'E' as the NMA. The microROM 23 and nanoROM 24 both access location 'E', the A2-PLA 12 decodes the contents of instruction register IRC, and the A1, A3, and A4 PLAs 13-15 decode the contents of instruction register IRA. At the next microcycle the nanoROM 24 provides an output 43 which specifies a command 'e' for the EU and BIU. The microROM 23 provides an output 42 which specifies an A1-PLA call. The A1-PLA 13 has already decoded the contents of instruction register IRA (the next macroinstruction) and the A1-PLA 13 provides an output 41 which is used as the NMA.

Microcycle timing is limited by the access times of ROMs 23 and 24 and the time required to generate the NMA. In order to minimize the microcycle time, the PLA decoding is performed in parallel with the ROM accesses, so that an NMA is selected from already available outputs. Major disadvantages to this scheme include the power consumption associated with activating or strobing all of the decode PLAs 12-15 and the ROMs 23,24, and timing restrictions associated with multiplexing the ROM and PLA outputs. The PLAs 12-15 operate in a precharge/discharge fashion such that signal lines within each PLA are precharged to a logic high state during one time period, and selectively discharged to a logic low state by the programmable devices within the PLAs during another time period. The microROM 23 and nanoROM 24 also function in a similar precharge/discharge manner. The PLAs 12-15 and the microROM 23 are particularly wasteful of power, in that all of the PLAs 12-15 and the microROM 23 are strobed each microcycle, but only a single PLA or the microROM 23 output is selected to supply the NMA. In the past, this described operation involves a tradeoff of sacrificing power consumption in order to obtain a high speed operation.

Figure 3:
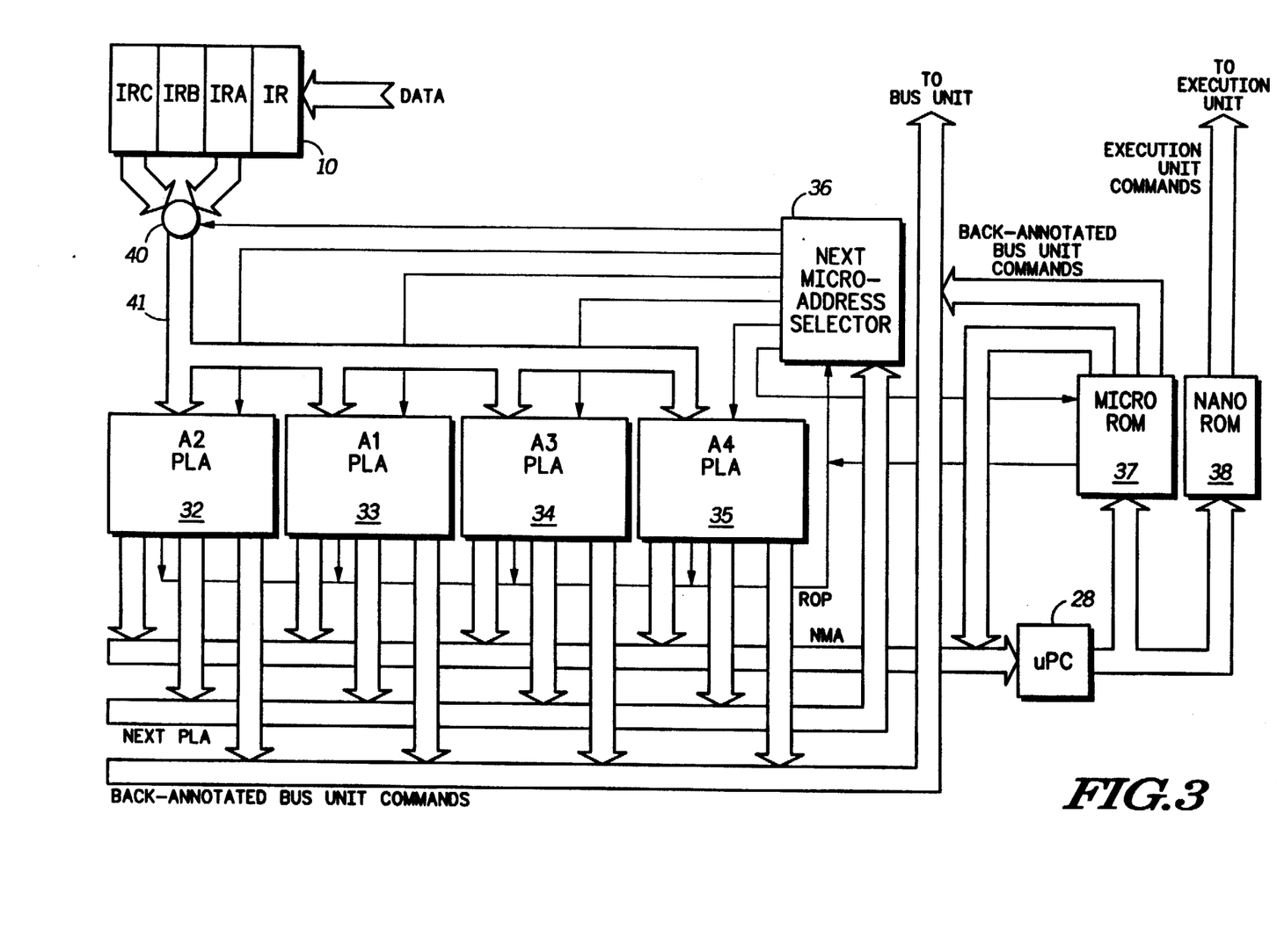
FIG. 3 is a block diagram of a data processor microsequencer in accordance with the present invention.

FIG. 3 shows a block diagram of a data processor microsequencer in accordance with the present invention. Elements shown in FIG. 3 which are common with the microsequencer of FIG. 1 will be given the same number for purposes of comparison and discussion. Referring to FIG. 3, two buses previously labeled 26 and 27 going from pipe 10 to the decode PLAs 12-15 in FIG. 1 have been replaced by a instruction register selector (IR-selector) 40 and a bus 41. A next microaddress selector 36 controls IR-selector 40, and selects whether instruction register IRA or instruction register IRC should be driven onto bus 41 and used by a plurality of decode PLAs 32-35. The PLAs 32-35 of FIG. 3 output the NMA information and additional information. This additional information includes: (1) a ROM-or-PLA (ROP) bit that specifies whether to activate a microROM 37 or one of PLAs 32,33,34 or 35 for the next microcycle; (2) a next-PLA field that specifies which of PLAs 32-35 will be called next; and (3) "back-annotated" command fields described below. The microROM 37 outputs include: the NMA information as in FIG. 1, the ROP bit, and back-annotated BIU commands. Each of PLAs 32-35 and microROM 37 receive an enable signal from the next microaddress selector 36. These enable signals select one of PLAs 32-35 or microROM 37. As will be discussed below, the enable signals selecting one of PLAs 32-35 or microROM 37 are generated early so that only the particular PLA or microROM 37 that actually supplies the NMA will be activated, thus saving power.

Figure 4A:
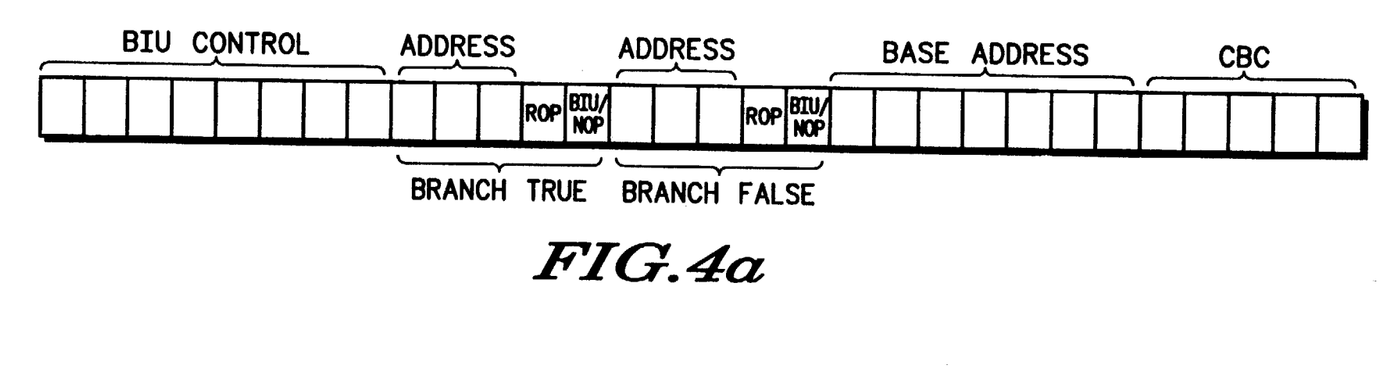
FIGS. 4a and 4b illustrate in instruction format output microcontrol field formats for a microROM and instruction decode PLAs of FIG. 3.
Figure 4B:
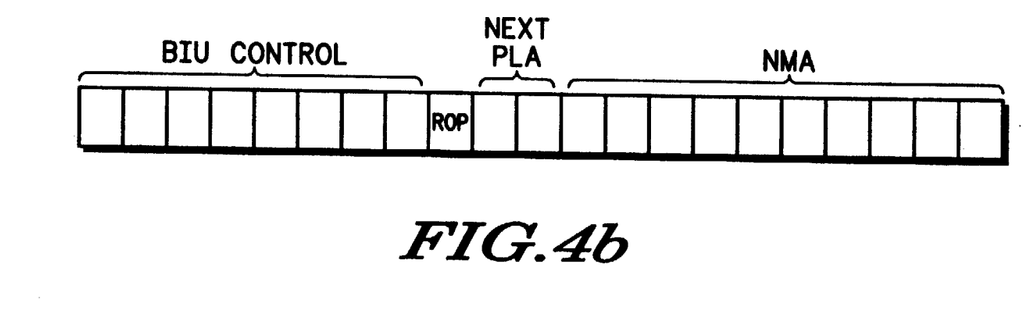

Each microinstruction has an inherent NMA or a PLA call associated with it. In the case of a microinstruction with a conditional microbranch, there are two inherent NMAs. FIG. 4a shows the microROM output format and FIG. 4b shows the PLA output format. In FIG. 4b, the entry PLA output contains a 10-bit NMA, a 2-bit next PLA field, a ROM-or-PLA select bit, and BIU control information. The 2-bit next-PLA field specifies which PLA call type should be issued for a subsequent PLA call. This next-PLA information is latched in the NMA selector and determines which PLA to activate in response to a subsequent PLA call. The ROM-or-PLA bit (ROP) determines whether to activate the microROM 37 or a PLA 32-35 during the next microcycle. The BIU control information specifies operand size, whether the operation is a read or write, whether the request is to be issued during the first or second phase of the microcycle, and other information relating specific types of bus cycles. The BIU control information is "back-annotated" as will be discussed later.

In FIG. 4a, microROM 37 contains a conditional branch control field (CBC), an NMA base address field, a branch false control field, a branch true control field, and the BIU control field. The base address field contains the seven most significant bits of the ten-bit NMA. The branch true and branch false control fields each contain: (1) the three least significant bits /f the ten-bit NMA; (2) a ROM-or-PLA select bit; and (3) a "use BIU control information or no-operation" select bit. The CBC field specifies the condition to be tested for a conditional microbranch. If the condition tested is true, the branch true control field information is used to generate the NMA (a concatenation of the seven-bit base address and the three-bit branch true address), issues a BIU command and activates either the microROM 37 or one of PLAs 32-35 for the next microcycle. The BIU command issued can be either the command specified by the BIU control field or a no-operation command. If the condition tested is false, then the branch false control information is used to generate the NMA, selectively issue the BIU command, and select the microROM 37 or one of PLAs 32-35 for the next microcycle. Again the BIU command issued can be either the command specified by the BIU control field or a no-operation command.

The Next-PLA Information

The microroutines are partitioned into routines that primarily perform either EA calculations or the instruction operation. The microroutines and the PLA calls are structured such that any one of PLAs 32–35 provide the initial microaddress for a particular microroutine, but a given microroutine will always exit by calling one particular PLA. For example, a particular microroutine might be entered from an A1-PLA call or an A2-PLA call but would always exit by performing an A2-PLA call. Thus, when a PLA call is made the PLA output generates the initial microaddress for a particular microroutine and identifies which PLA that microroutine will call. This information is referred to as the 'next-PLA' information. The next-PLA information is latched by the next microaddress selector 36 where it is used to control selector 40 and is stored until a subsequent PLA call is made. When the subsequent PLA call is made, the latched next-PLA information is used to activate only the particular PLA being called. F/r example, if a PLA call is made and the latched next-PLA information specifies A1-PLA 33, selector 40 drives bus 41 with the contents of instruction register IRA and then A1-PLA 33 is activated to decode this value from bus 41.

It should be further noted that PLAs 32–35 of the present invention may be implemented in various forms including changing the PLA structures and data bus sizes. For example, a single or a shared PLA structure may be implemented. In this context, a 'shared' PLA is understood to mean a PLA with multiple first logic planes and a shared second logic plane. In such alternate forms, the next PLA information can also be used in selecting a next type of decode operation to perform. When a shared PLA is implemented, circuit area may be further reduced.

Back-Annotated Bus Control Information

In one form of the invention, certain control signals for a microcycle are "back-annotated" such that they are supplied not by the presently executing microinstruction fetch but by the earlier fetch of the previous microinstruction. Thus, the current microinstruction fetch contains the execution unit control information for the current microcycle and the bus interface unit (BIU) control information for the following microcycle.

The Bus Interface Unit (not shown) is an autonomous unit that schedules and performs operand and prefetch bus cycles for the microsequencer. BIU control information from microROM 37 can request the BIU to perform an operand read or write operation, or request that instruction prefetching branch to a specified address. The BIU also has the ability to stall microcode execution when certain bus cycle related activities have not yet completed (i.e. microcode wants to use the data from a read bus cycle which has not yet completed). By back-annotating the control information, the BIU can anticipatorially schedule and prepare for upcoming bus cycles.

The back-annotated BIU information also allows a conditional branch (macroinstruction) taken to start earlier. In a known data processor architecture, the condition is tested, a microinstruction branch occurs (generating an NMA), a ROM accesses is made, and the 'branched to' microinstruction requests that instruction prefetching branch to a specified address. With the present invention, the back-annotated BIU information is available at the same time the NMA for the microinstruction is available. A special BIU command encoding allows the new fetch to be issued prior to the 'branched to' microinstruction's execution, and without having to wait for the ROM access.

Back-annotation is implemented by having the PLAs 32–35 supply the first microinstructions BIU control information, and having the microROM 37 supply subsequent BIU control information. The microcode is written as is typical without backannotation. During assembly, a microassembler (not shown) automatically back-annotates the BIU information.

Back-annotating the BIU control information places certain restrictions on the microcode due primarily to microinstruction branching. In the case of a conditional microbranch, there are two potential branch destination microinstructions. Both of these destination microinstructions must use the back-annotated BIU control information generated by a 'branched from' microinstruction. In the illustrated form, a field in microROM 37 specifies the BIU control information and additional control bits for each branch case. These control bits allow each branch case (branch true and branch false) to either use the specified BIU control information or force a BIU no-operation command. These additional bits increase the flexibility for microcode branching in that the two potential microbranch destinations can either: (1) both use the same BIU control information; or (2) one destination can use the BIU control information and the other destination can request no action of the BIU (no-operation or null command). Alternately, at the expense of additional microROM bits, one could implement separate BIU control fields for both the branch-true and branch-false cases.

The ROM-or-PLA Bit

Similar to the generation of bus control information, the ROM-or-PLA control bit (ROP) is back-annotated. In previous data processors, a PLA call information was contained within the current microinstruction. As has been previously discussed, this required that the PLAs and the microROM 37 be activated in parallel with a nanoROM 38 access during every microcycle so that the appropriate NMA is available if needed. By back-annotating the ROM-or-PLA control bit into the previous microinstruction, only the microROM 37 or a single PLA (as specified by the Next-PLA or NPLA latch) needs to be activated. Again, this reduces power consumption by selecting only the unit (microROM 37 or PLA) that will supply the NMA.

Figure 5:
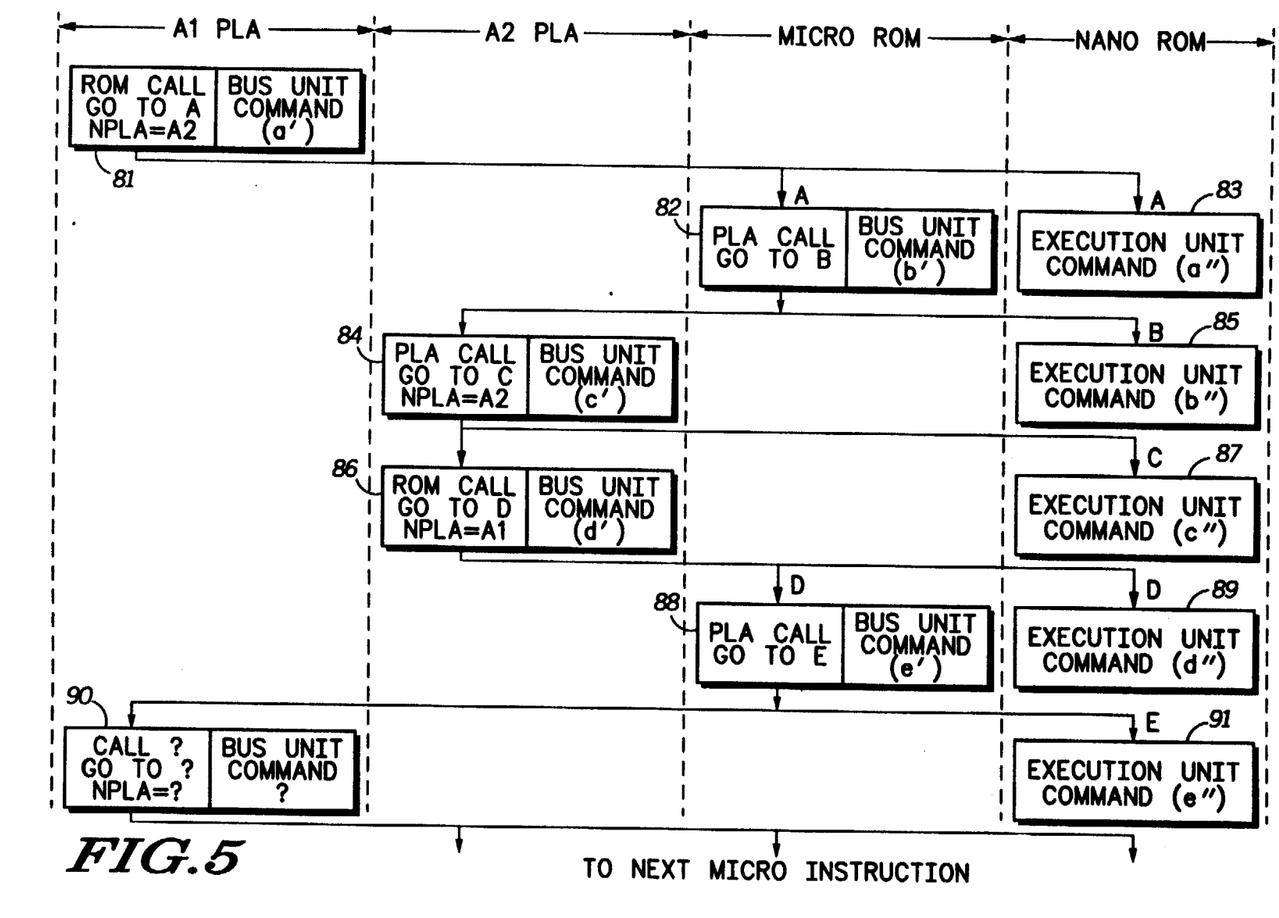
FIG. 5 is a flow diagram of an instruction sequence using the data processor microsequencer of FIG. 3.

FIG. 5 shows one example of an instruction microcode flow(analogous to the microinstruction flow in the previous example of FIG. 2) as executed with the present invention. The A1-PLA 33 provides output data 81 which specifies: (1) an address 'A' as the initial microaddress; (2) information that the microROM 37 be activated for the next microcycle; (3) information that the A2-PLA 32 will be used for the next PLA call; and (4) a command 'a' for controlling the BIU. Selector 40 is configured to drive instruction register IRC onto bus 41. The microROM 23 command 'a' from FIG. 2 is partitioned into command 'a' for the BIU portion and command a" for the EU portion. The microROM 37 and nanoROM 38 both access location 'A' in FIG. 5. At the next microcycle, nanoROM 38 provides an output 83 which specifies a command a" for the execution unit (EU). The microROM 37 provides an output 82 which specifies: (1) an address 'B' as the NMA to be accessed; (2) that a PLA be activated for the next microcycle; and (3) a command b' for controlling the BIU. The nanoROM 38 accesses location 'B'. The A2-PLA 32 decodes the value from bus 41. At the next microcycle the nanoROM 38 output 85 specifies command b" for the EU. The A2-PLA 32 provides an output 84 which specifies: (1) address 'C' as the NMA to be accessed; (2) that a PLA be activated for the next microcycle; (3) that the A2-PLA 32 will be used for the next PLA call; and (4) a command c' for controlling the BIU. In one form, selector 40 is configured to drive instruction register IRC onto bus 41. The A2-PLA 32 decodes the value from bus 41. The nanoROM 38 accesses location 'C'. At the next microcycle the nanoROM 38 provides an output 87 which specifies a command c" for the EU. The A2-PLA 32 provides an output 86 which specifies: (1) address 'D' as the NMA to be accessed; (2) that the microROM 37 be activated for the next microcycle; (3) that the A1-PLA 33 be used for the next PLA call; (4) and issues a command d for controlling the BIU. The microROM 37 and nanoROM 38 both access location 'D'. At the next microcycle the nanoROM 38 provides an output 89 which specifies a command d" for the EU. The microROM 37 provides an output 88 which specifies: (1) an address 'E' as the NMA to be accessed; (2) that a PLA be activated for the next microcycle; and (3) issues command e' for the BIU. Selector 40 is configured to drive instruction register IRA onto bus 41. The nanoROM 38 access location 'E'. The A1-PLA 33 decodes the value from bus 41. At the next microcycle the nanoROM 38 provides an output 91 which specifies a command e" for the EU. The A1-PLA 33 provides an output 90 which provides the NMA, ROP, Next-PLA, and BIU information for the initial microroutine for performing the next macroinstruction.

By now it should be apparent that there has been provided a data processor microsequencer which utilizes an embedded control bit or control signal for the purpose of selectively disabling next microaddress circuitry. By using the embedded control information in a microsequencer, the present invention minimizes power consumption in a data processor.

While the present invention has been shown and described with reference to a particular embodiment thereof, various modifications and changes thereto will be apparent to those skilled in the art and are within the spirit and scope of the present invention.

We claim:
1. In a data processor, a microsequencer comprising:
an instruction pipe having input means for receiving macroinstructions, holding means for holding said macroinstructions and output means for providing said macroinstructions as outputs;
a decoder having first input means coupled to the output means of the instruction pipe for receiving said macroinstructions, second input means for receiving a first enable signal, decode means for decoding, only while said first enable signal is being received, each said macroinstruction and for producing, in response to decoding each said macroinstruction, a first plurality of signals comprising a first next microaddress bit field and a first subsequent microaddress source selection bit field, first output means for providing said first next microaddress bit field as an output and second output means for providing said first subsequent microaddress source selection bit field as an output;
a memory having first input means for receiving an address signal, second input means for receiving a second enable signal, means for producing, in response to said address signal and only while said second enable signal is being received, a second plurality of signals comprising a second next microaddress bit field and a second subsequent microaddress source selection bit field, first output means for providing said second next microaddress bit field as an output and second output means for providing said second subsequent microaddress source selection bit field as an output;
subsequent microaddress selection logic having input means coupled to the second output means of the decoder and to the second output means of the memory for receiving, during a first time period, either the first subsequent microaddress source selection bit field or the second subsequent microaddress source selection bit field, and output means for producing, during a second time period subsequent to the first time period, either the first enable signal or the second enable signal, but not both the first enable signal and the second enable signal simultaneously;
a next microaddress latch having input means coupled to the first output means of the decoder and to the first output means of the memory for receiving, during said first time period, either the first next microaddress bit field or the second next microaddress bit field, and output means coupled to the first input means of the memory for providing, during the second time period, the signal received by the input means during the first timer to the memory as said address signal.

2. In a data processor, a method of microsequencing comprising the steps of:
during a first microcycle, performing the steps of:
decoding a macroinstruction received from an instruction pipe to produce a first next microaddress bit field and a first subsequent microaddress source selection bit field;
latching in a next microaddress latch the first next microaddress bit field;
receiving in a subsequent microaddress source selector the first subsequent microaddress source selection bit field; and
operating the subsequent microaddress source selector, based upon a signal received during a microcycle prior to said first microcycle, to de-activate a memory;
during a second microcycle immediately following the first microcycle,
performing the steps of:
operating the subsequent microaddress source selector, based upon the first subsequent microaddress source selection bit field received during the first microcycle, to activate the memory and to de-activate the decoder;
operating the memory to receive the first next microaddress bit field from the next microaddress latch and to produce a second next microaddress bit field and to produce a second subsequent microaddress source selection bit field;
latching in the next microaddress latch the second next microaddress bit field; and
receiving in the subsequent microaddress source selector the second subsequent microaddress source selection bit field.

* * * * *